Aug. 14, 1956    A. C. DAVIS    2,758,731
CASE UNLOADER
Filed Nov. 15, 1952    7 Sheets-Sheet 1
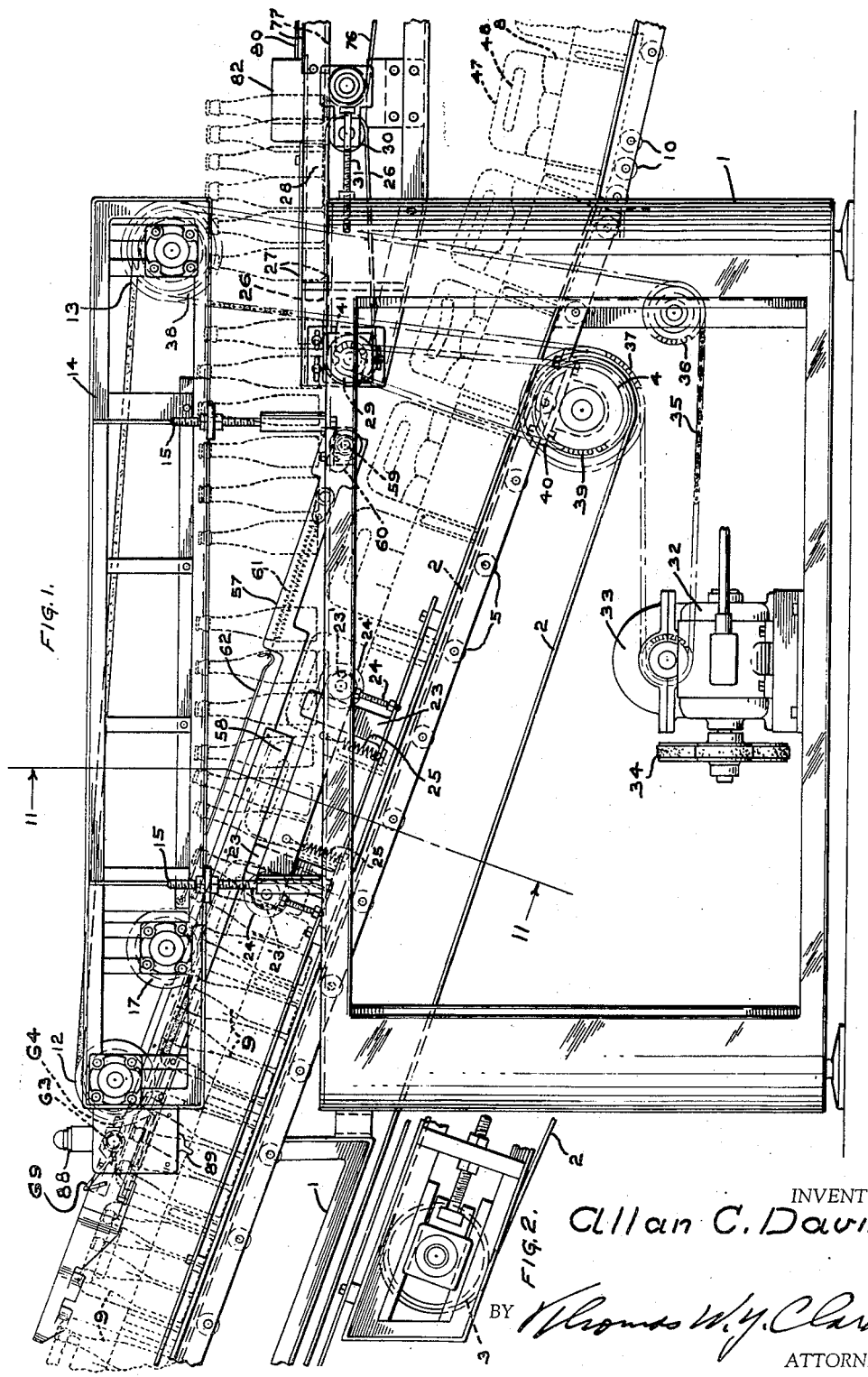
INVENTOR
Allan C. Davis
BY
ATTORNEY

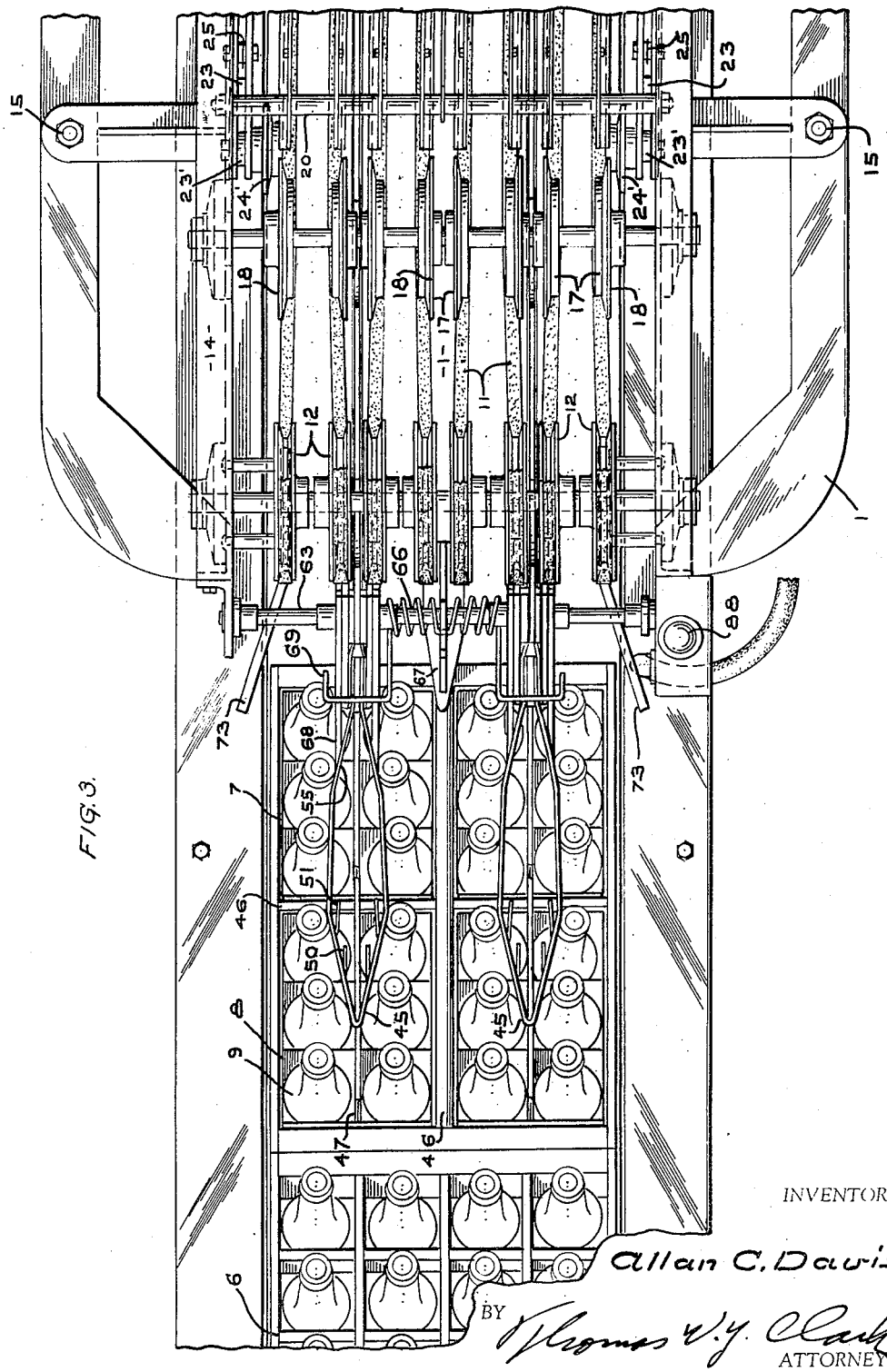

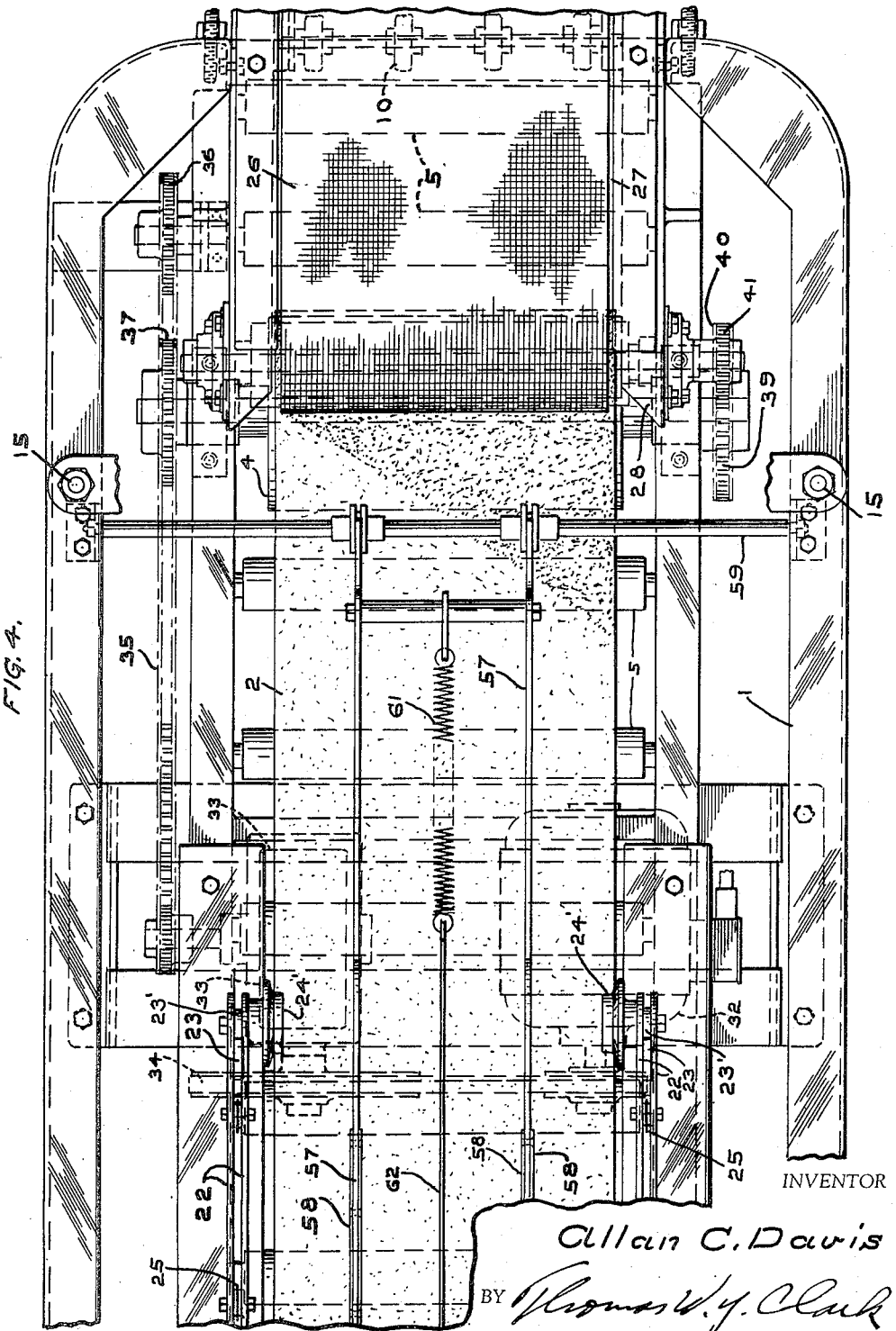

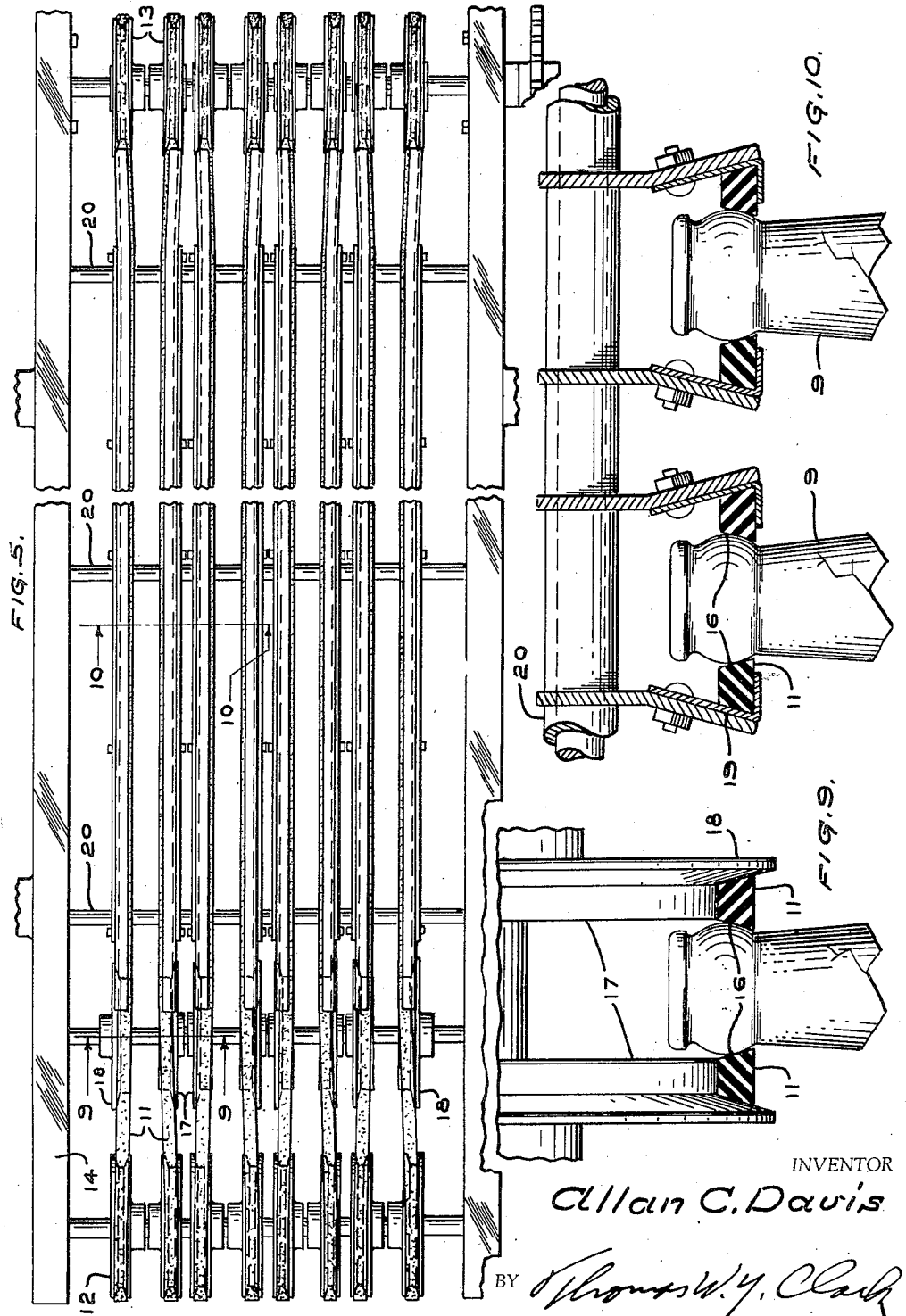

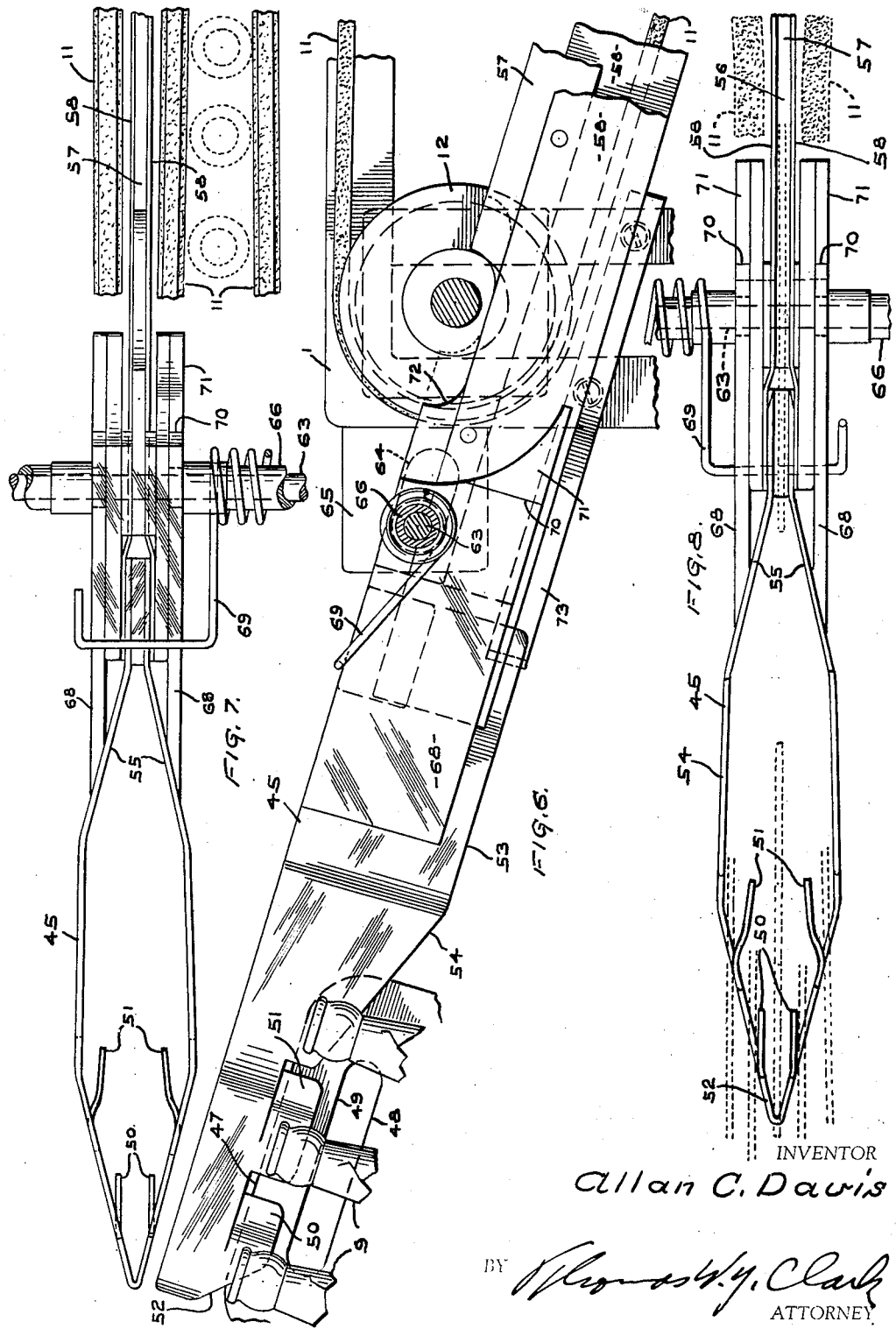

Aug. 14, 1956  A. C. DAVIS  2,758,731
CASE UNLOADER
Filed Nov. 15, 1952  7 Sheets-Sheet 6
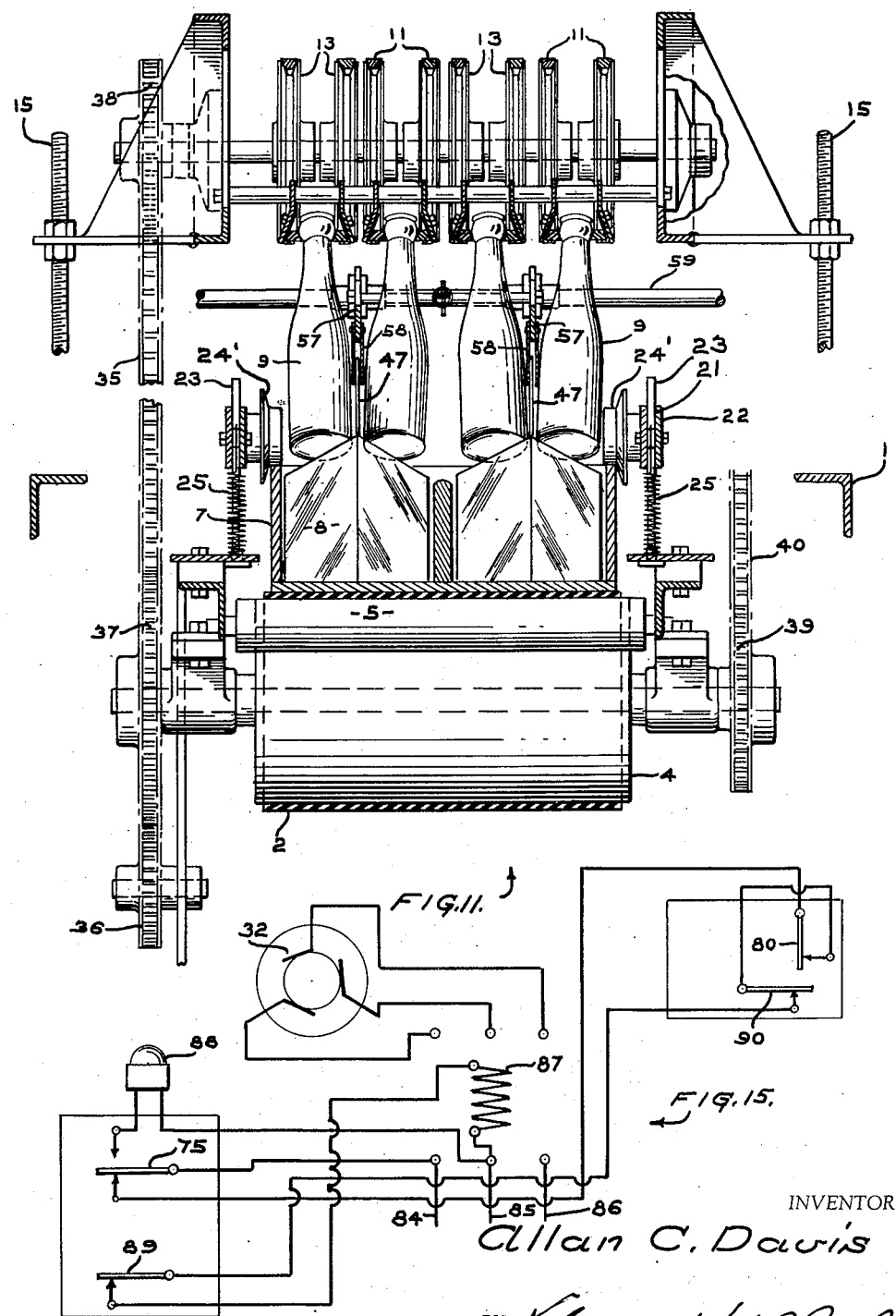
INVENTOR
Allan C. Davis
BY Thomas W. J. Clark
ATTORNEY

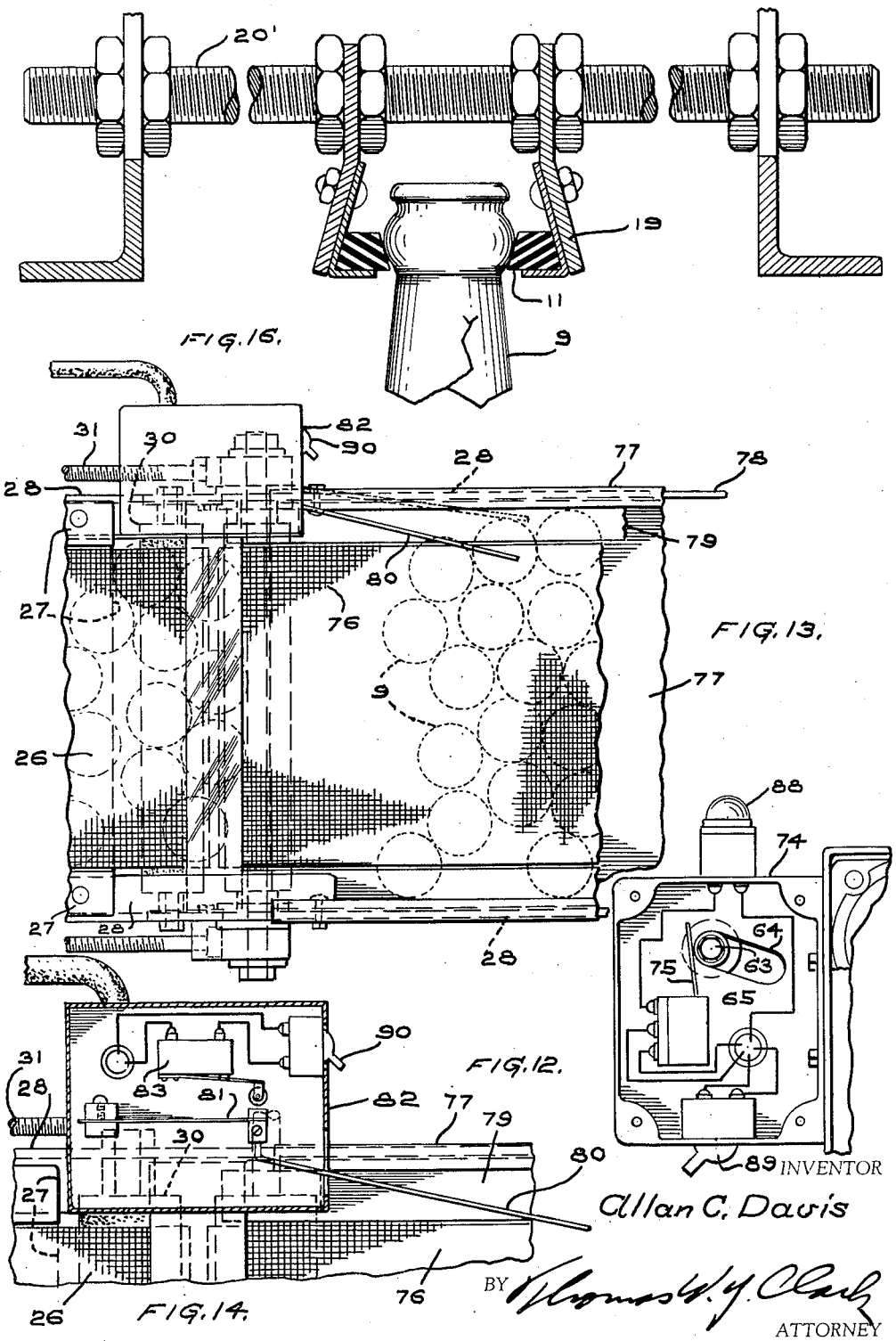

United States Patent Office 2,758,731
Patented Aug. 14, 1956

2,758,731

CASE UNLOADER

Allan C. Davis, Baltimore, Md.

Application November 15, 1952, Serial No. 320,679

6 Claims. (Cl. 214—309)

This invention relates to a case unloader and it is specifically directed to such a device as will operate continuously. Heretofore it has been the practice to feed a series of cases containing bottles and like articles along a conveyor and to stop each case long enough for the articles to be removed from it and then for the unloader itself to deposit the removed articles on another platform or conveyor.

In the instant invention this operation takes place continuously without stopping the case conveyor or the cases on the conveyor and without the need of a group of descending jaws to grip the individual articles to remove them from the cases. According to this invention the cases are passed along a conveyor and guides or spreaders are passed between the necks of the articles to definitely align them and guide them between opposed continuous bands which are then pressed tightly against the edges of the article tops and then diverging from the path of the case conveyor, they lift the articles from the cases. After this removal of the articles from the cases the articles are deposited upon an article conveyor which carries them on to the next succeeding operation which in the case of bottles may be feeding the bottles to a washing machine.

The objects of the present invention are to make a case unloader operating on the above principles and in which the band conveyor preferably has a V-shaped contour so that the wide part of the V enters under the expanded part of the neck of the bottle and like article to securely hold it. Another object of the invention is to make the band conveyor of resilient soft material to avoid injury to the bottles as they are gripped. Another object of the invention is to place the band conveyor in parallel operation with the case conveyor so that the articles are guided between the bands of the band conveyor and held securely before the diverging of the band conveyors and the case conveyor begins. Another object of the invention is to so separate the cartons that may contain the articles and which cartons are placed in cases, that they will not themselves be picked up by the band conveyors or otherwise interfere with the operation of the band conveyors in their engagement of the articles next to them.

Another object of the invention is to embody safety devices in the feeding of the articles to the band conveyors so that should imperfect articles or damaged cartons interfere with the proper operation of the unloader, the unloader may be stopped and warning be given to an operator so that the faulty condition may be corrected. Other objects and advantages of the invention will be apparent from the following description and the accompanying drawings forming a part hereof and from this description it will also be apparent that the case unloader of the instant invention will operate continuously and for long periods of time without interruption as cases full of bottles or like articles are fed to it in great numbers as a continuous operation in a bottling plant.

In the drawings in which similar numerals refer to similar parts throughout the several views:

Figure 1 is a side elevational view of the central portion of the machine.

Figure 2 is a continuation of the case conveyor of Figure 1 to the left.

Figure 3 is a top plan view of the machine showing the feeding of bottles to the band conveyors.

Figure 4 is a continuation of part of the machine to the right from Figure 3 with the band conveyors omitted.

Figure 5 is a horizontal sectional view showing the bottle engaging sections of the band conveyors.

Figure 6 is a side elevational view of the bottle and carton guiding or directing mechanism.

Figure 7 is a top plan view thereof.

Figure 8 is an inverted plan view thereof.

Figure 9 is a sectional view on line 9—9 of Figure 5.

Figure 10 is a sectional view on line 10—10 of Figure 5.

Figure 11 is a cross-sectional view on line 11—11 of Figure 1.

Figure 12 is a fragmentary side elevational view of a safety device to stop the machine when cartons or broken bottles might foul its operation.

Figure 13 is a fragmentary elevational view of the delivering end of the machine showing a safety device to stop the machine when more bottles are delivered than are accommodated in the next operating machine.

Figure 14 is an enlarged sectional view of the switch operating mechanism shown in Figure 13.

Figure 15 is a diagrammatic view of the electric circuits involved in the two safety devices.

Figure 16 is an alternate form of mounting for the band conveyors stabilizing guides.

The case unloader is mounted on a frame 1 which carries a case conveyor 2 carried by rollers 3 and 4 and the upper run of the conveyor is supported by intermediate rollers 5. This case conveyor is intended to have placed on it partitioned cases 6, or cases 7 carrying a plurality of cartons 8 of bottles or like articles 9, the partitioned cases 6 likewise carry similar bottles. This case conveyor preferably slopes downwardly from the infeed end of the machine and after emptying the cases, they pass from the machine on a roller conveyor 10 under the influence of gravity.

Band conveyors 11, each conveyor comprising two bands, are carried between pulleys 12 and 13 mounted in framework 14 supported by rods 15 from the top of frame 1. As clearly shown in Figure 5 the sets of pulleys 12 and 13 are spaced apart to clear the expanded part 16 of the bottles 9, pulleys 12 are placed in such a position down on the bottles as to guide the bands 11 beneath this expanded part of the bottle neck. A third group of pulleys, or sectioned guides 17 is placed between pulleys 12 and 13 at substantially the same distance from case conveyor 2 as are pulleys 12 so that a portion of the band conveyors runs parallel with the case conveyor to certainly align the bottle necks with the gripping portions of the bands. The rotating guides 17 are flanged as at 18 on their outsides to guide the bands inwardly securely upon the bottle necks as clearly shown in Figure 9. Stabilizing guides 19 supported by transverse shafts 20 are placed parallel to one another to continue to hold the bands 11 in the gripping position initiated by the rotating guides 17.

As clearly shown in Figure 1 the band conveyors 11 diverge from the case conveyor 2 vertically and consequently lift the bottles substantially directly from the compartments of the cases or the cartons. Floating case guides 21 are on each side of the case conveyor and they comprise spaced plates 22, spaced by rollers 23', spanning angularly directed uprights 23 mounted on the sides of the case conveyor. The case guides are held upwardly by set screws 24, and have in each of them flanged rollers 24', on the axles of rollers 23', which engage the sides of the cases and hold them down by means of springs 25 connected to the guides 21 and the sides of the case conveyor. By this mounting these guides are allowed to accommodate themselves to cases of different sizes, or even of irregular configuration.

At the delivering end of the machine a bottle conveyor 26 preferably having a wire surface to allow the bottles to readily slide thereon receives the bottles from the band conveyors as they are separated by the pulleys 13 after they leave the ends of the stabilizing guides 19. The bottle conveyor 26 slides over a tray 27 mounted on the side frames 28 supporting this conveyor on rollers 29 and 30, roller 30 having a belt tightening means 31. The conveyors are driven by a motor 32, driving gear reduction 33 by means of belt 34, the gear reduction 33 drives sprocket chain 35 going over idler 36 and drives sprocket 37 on the shaft of the case conveyor roller 4 and then extends upwardly to sprocket 38 to drive the band conveyor 11. Through the shaft of roller 4 sprocket 39 on this shaft drives sprocket chain 40 to drive sprocket 41 on roller 29 to drive the bottle conveyor 26.

Bottle and carton guides 45 are placed over the case conveyor 2 as this conveyor enters the machine. The cases usually carry four cartons of six bottles each and the cartons are placed in the cases with partitions 46 spaced to separate the cartons to align the bottles in four rows of six bottles each, the cartons usually having a center partition 47 and they usually have a handle opening 48 from one side of which the blank of the handle may project from adjacent the top edge 49 of the handle opening. To separate this center partition from the bottle, the bottle and carton guide 45 has inwardly projecting guide fingers 50 and 51. The guide is notched as at 52 to permit the center partition to enter therebetween and the guides 50 and 51 then continue to hold the partition centrally between them while pushing the bottle necks away from the center partition as shown in Figures 3, 6 and 7. The guide 45 is deeper towards the back and the wide portion 53 is joined to the shallow portion by an angular line 54 which will guide the handle flaps which may project from the upper edge 49 of the handles of the center partitions downwardly and away from interference with the bottles and their necks as they pass in a central position directly within the guides 45. The guides 45 are then bent inwardly centrally as shown at 55 to centralize the center partitions of the cartons.

Center partition holding guides 56 comprising a center plate 57 and side plates 58 fixed to each side thereof receive the carton center partitions from the guides 45 and hold them down, thereby holding the cartons in the cases as the bottles are pulled therefrom as shown in Figure 1. The center plate 57 is mounted at its forward end on cross rod 59 through means of slots 60 in the plates. The center guides are pulled rearwardly by means of spring 61 attached to hook 62 which in turn is attached to the band conveyor frame 14. The center plates 57 are mounted at their rear ends on rod 63 sliding in slots 64 in plates 65 projecting from the infeed end of frame 1 of the machine.

The bottle and carton guides 45 are pivoted on this rod 63, and rod 63 has thereon sleeve sections 66 between which the center plates 57 are firmly held to prevent the rotation of the sleeve. A center bottle guide 67 is also rigidly attached to the rod 63 to separate the rows of bottles centrally, as shown in Figure 3. The guides 45 are reinforced by side members 68 which pivot around sleeve 66 so that the guides 45 may be raised for clearing irregular bottles or cartons from the machine. The guides 45 are held down in their position aligned with center plate 57 by means of spring 69 around sleeve sections 66 and held from rotating thereon by passing through center bottle guide 67. Reinforcing members 68 terminate in a sharp edge 70 and bear against members 71 securely affixed to side plate 58 to prevent guide 45 from going below its aligned position with center plate 57. This center plate 57 is cut out as shown at 72 to allow its longitudinal movement with respect to the shaft carrying pulleys 12. It will therefore be apparent that the guide 45 will be pushed forwardly with the cases, should the cartons and bottles not be properly guided and separated by these guides. Outer guides 73 mounted on the sides of the frame 1 guide the bottles in from the extreme outside of the machine. It will therefore be seen that each line of bottles has guides on both sides to guide them between the band conveyors 11 as these conveyors pass around pulleys 12 and as the conveyors pass these pulleys and are guided together by the flanged guides 17, the bottles are firmly held at their necks below the expanded portion of them.

The slot 64 in plate 65 carrying shaft 63 on one side of the machine is mounted in a casing 74 which carries the switch 75 which is normally in the position shown in Figures 12 and 15 when the machine is operating.

The bottles pass from bottle conveyor 26 to the conveyor 76 for the next operation which may be the infeed conveyor of a washing machine. This conveyor 76 is also preferably of wire formation having a supporting pan 77 which at its edges is wrapped around longitudinally extending members 78. The conveyor is preferably the same width as the bottle conveyor 26 and fillers 79 are preferably placed at the side of conveyor 76 to allow for the presence of a larger number of bottles beyond the bottle conveyor 26. A switch 80 is at one side of conveyor 76 and when this conveyor becomes full of bottles the case unloader is stopped by the presence of the bottles contacting the switch arm 80 and swinging it outwardly. This arm is preferably mounted in a spring 81 in casing 82 on the side of the machine and the arm 81 operates the arm of the conventional switch 83. The switch arm 80 for the normal operation of the machine, while in operation, is in the position shown in Figure 14 and diagrammatically in Figure 15.

Figure 15 diagrammatically illustrates the wiring in which three-phase leads 84, 85 and 86 are closed to the motor 32 by means of relay 87 to start the machine in operation. When switch 75 has its position thrown from that illustrated in Figure 15 by the bottle and carton guide 45 being moved forward, the circuit to the motor is interrupted and the circuit to the light 88 connected and warning is given. A manual switch is also shown at 89 to stop the machine at the infeed end. Likewise when switch 80 is thrown by a congestion of bottles on conveyor 76, the circuit to the motor is interrupted as shown in Figure 15. Also a manual switch 90 is at the delivery end of the machine by means of which the machine may be stopped.

The rods 20 carrying the stabilizing guides 19 may be of the form shown in Figure 16, that is the guides 19 may be adjusted laterally of the machine along threaded rods 20' to adjust the guides to a different neck width of bottle and quite accurately to the bottles being carried.

The operation of the machine will be apparent from the above detailed description and it will also be apparent that many modifications may be made in the detailed construction of the parts of the machine without departing from the invention as defined in the following claims.

What is claimed as new and is desired to be secured by Letter Patent is:

1. A compartment case unloader for removing upright bottles from compartment cases to a bottle delivery position comprising a case conveyor, a pair of continuous conveying bands, spaced pulleys on which said bands are mounted and about which they form paths of travel from a position adjacent the case conveyor and spaced above said conveyor to engage the bottles, to the bottle delivery position, and in which positions said bands are spaced from each other to pass bottles freely therebetween, means to bend the bands in their paths of travel between said pulleys to grip the bottles firmly therebetween and retain them until they reach the bottle delivery position, means to diverge the paths of travel of the conveyor and bands to remove the bottles from the cases, and guided floating means to engage the edges of cases of irregular configuration on said case conveyor to retain the cases in the diverging paths of the case conveyor and bands.

2. A compartment case unloader for removing upright bottles from compartment cases to a bottle delivery position comprising a case conveyor, a pair of continuous conveying bands each presenting facing the other a continuous gripping surface, spaced pulleys on which said bands are mounted and about which they form paths of travel from a position adjacent the case conveyor and spaced above said conveyor to engage the bottles, to the bottle delivery position, and in which positions said bands are spaced from each other to pass bottles freely therebetween, stationary guides engaging one side of each row of bottles to guide them to the bands, a forwardly movable guide above said conveyor to guide the bottles from the other side of each row uprightly to the bands, means to stop the conveyor and bands upon forward movement of the guides.

3. A compartment case unloader for removing upright bottles from compartment cases to a bottle delivery position comprising a case conveyor, multiple pairs of continuous conveying bands the bands of each pair presenting facing each other a continuous gripping surface, spaced pulleys on which said bands are mounted and about which they form paths of travel from a position adjacent the case conveyor and spaced for a portion of their travel above said conveyor to engage the bottles, to the bottle delivery position and in which positions the bands are spaced in pairs from each other to pass bottles freely therebetween, a movable guide between adjacent pairs of bands to separate and guide bottles passing to each adjacent pair of bands, the movable guides extending on one side only of each row of bottles, means to drive said conveyors and bands and means connected to the driving means and movable guide to stop the driving means upon movement of the movable guide, stationary guides engaging the rows of bottles from their sides opposite and after their engagement by the movable guides to assure their alignment with the bands and means to bend the bands of each pair in their paths of travel between their respective pulleys to grip the bottles firmly therebetween and retain them until they reach the bottle delivery position.

4. Bottle unloading apparatus for removing bottles from a plurality of cartons supported within a case with the bottles aligned in spaced apart rows, the cartons having center partitions aligned with the rows of bottles, the necks of said bottles extending above the cartons and above at least the ends of the case, comprising a case conveyor inclined downwardly from the input end thereof to the discharge end for moving the cartons in line with said partitions, a substantially horizontal bottle conveyor mounted above said case conveyor and having a pair of endless bands for each row of bottles and aligned therewith, the bands comprising each pair being spaced apart at the input and discharge ends thereof for freely receiving the necks of bottles therebetween, means for converging the bands of each pair intermediate the ends thereof whereby the necks of bottles interposed therebetween are firmly gripped between the bands intermediate their ends, drive means for continuously moving said bands, and guide means above said case conveyor and forward of the on-coming center handle partitioned cartons, to separate the on-coming center partition from the bottles when the partitions contact therewith and guide the bottles to said bottle conveyor.

5. A compartment case unloader for removing upright bottles having expanded upper neck portions from compartment cases to a bottle delivery position comprising a case conveyor, a pair of continuous conveyor bands, each presenting facing the other a continuous gripping surface, spaced pulleys on which said bands are mounted and about which they form paths of travel from a position adjacent the case conveyor to the bottle delivery position and in which positions said bands are spaced to pass a bottle neck freely therebetween beneath the expanded neck portion and means adjacent the case conveyor to bend the bands in their paths of travel, between said pulleys, toward one another to engage and grip a bottle firmly between them to sustain the bottle for a portion of their paths of travel, said case conveyor and the pulleys on which said conveyor bands are mounted being positioned to vertically diverge the paths of the case conveyor and conveyor bands after bottle engagement, to separate bottles from cases, and means bearing beneath and sidewise upon the bands to support the bands and bottles and compress the bands continuously against the bottle necks during the carriage of the bottles.

6. A compartment case unloader for removing upright bottles having expanded upper neck portions from compartment cases to a bottle delivery position comprising a case conveyor, a pair of continuous conveying bands each presenting facing the other a continuous gripping surface, spaced pulleys on which said bands are mounted and about which they form paths of travel from a position adjacent the case conveyor to the bottle delivery position, and in which positions said bands are spaced from each other to pass bottles freely therebetween beneath the expanded neck portions, a pair of guide pulleys to bend the bands in their paths of travel between said spaced pulleys to engage and grip the bottles firmly therebetween to sustain the bottles and means bearing beneath and sidewise upon the bands to compress the bands against the necks of the bottles substantially continuously in firm bottle gripping position to sustain the bottles until the bands reach bottle delivery position, the case conveyor and conveyor band pulleys being positioned to parallel the paths of travel of the case conveyor and band conveyor during bottle engagement and to vertically diverge the paths thereafter to separate the bottles from the cases.

References Cited in the file of this patent

UNITED STATES PATENTS

| 1,163,729 | Whitaker | Dec. 14, 1915 |
| 2,213,774 | Taylor | Sept. 3, 1940 |
| 2,372,646 | Barnby et al. | Apr. 3, 1945 |
| 2,567,009 | Calhoun et al. | Sept. 4, 1951 |
| 2,602,555 | Hutaff | July 8, 1952 |
| 2,608,308 | Taylor | Aug. 26, 1952 |
| 2,634,874 | Rideout et al. | Apr. 14, 1953 |
| 2,696,927 | Copping | Dec. 14, 1954 |

FOREIGN PATENTS

| 684,464 | Germany | Nov. 29, 1939 |
| 540,501 | Great Britain | Oct. 20, 1941 |